(12) United States Patent
Medwick et al.

(10) Patent No.: US 7,910,229 B2
(45) Date of Patent: Mar. 22, 2011

(54) SUBSTRATE HAVING THERMAL MANAGEMENT COATING FOR AN INSULATING GLASS UNIT

(75) Inventors: Paul A. Medwick, Glenshaw, PA (US); Andrew V. Wagner, Pittsburgh, PA (US); Dennis J. O'Shaughnessy, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 196 days.

(21) Appl. No.: 11/519,188

(22) Filed: Sep. 11, 2006

(65) Prior Publication Data

US 2007/0116967 A1 May 24, 2007

Related U.S. Application Data

(63) Continuation of application No. 10/428,481, filed on May 2, 2003, now abandoned.

(60) Provisional application No. 60/377,783, filed on May 3, 2002.

(51) Int. Cl.
*B32B 15/04* (2006.01)
*B32B 17/06* (2006.01)

(52) U.S. Cl. ........ 428/701; 428/432; 428/689; 428/699; 428/702

(58) Field of Classification Search .................. 428/428, 428/432, 469, 701, 702, 699, 698, 689; 204/192.1, 204/192.26; 427/162, 164, 165

See application file for complete search history.

(56) References Cited

U.S. PATENT DOCUMENTS

| | | | |
|---|---|---|---|
| 4,746,347 A | 5/1988 | Sensi | 65/94 |
| 4,786,563 A | 11/1988 | Gillery et al. | 428/630 |
| 4,792,536 A | 12/1988 | Pecoraro et al. | 501/70 |
| 4,898,789 A | 2/1990 | Finley | 428/623 |
| 4,898,790 A | 2/1990 | Finley | 428/623 |
| 5,059,458 A | 10/1991 | Goodall | 428/34 |
| 5,240,886 A | 8/1993 | Gulotta et al. | 501/70 |
| 5,385,872 A | 1/1995 | Gulotta et al. | 501/71 |
| 5,393,593 A | 2/1995 | Gulotta et al. | 428/220 |
| 5,595,825 A | 1/1997 | Guiselin | 428/428 |
| 5,655,282 A | 8/1997 | Hodek et al. | |
| 5,821,001 A * | 10/1998 | Arbab et al. | 428/623 |
| 5,837,108 A * | 11/1998 | Lingle et al. | 204/192.15 |
| 5,837,361 A | 11/1998 | Glaser et al. | 428/216 |

(Continued)

FOREIGN PATENT DOCUMENTS

EP     0 336 257     10/1989

(Continued)

OTHER PUBLICATIONS

Carmody et al. "Residential Windows", published 2000.*

(Continued)

*Primary Examiner* — Jennifer C McNeil
*Assistant Examiner* — Lauren Robinson
(74) *Attorney, Agent, or Firm* — Andrew C. Siminerio

(57) ABSTRACT

A coated article is provided for use in an IG unit. The article includes a substrate and a coating formed over at least a portion of the substrate. The coating includes a plurality of separation layers having one or more dielectric layers and a plurality of infrared reflective layers. The coating can be positioned on the #2 or #3 surface of the IG unit and can provide a reference solar heat gain coefficient of less than or equal to 0.35.

14 Claims, 1 Drawing Sheet

U.S. PATENT DOCUMENTS

| | | | | |
|---|---|---|---|---|
| 5,902,505 A * | 5/1999 | Finley | | 219/547 |
| 5,942,338 A | 8/1999 | Arbab et al. | | 428/623 |
| 6,042,934 A | 3/2000 | Guiselin et al. | | 428/213 |
| 6,849,328 B1 | 2/2005 | Medwick et al. | | |
| 2002/0045037 A1 | 4/2002 | Boire et al. | | 428/216 |
| 2002/0136905 A1* | 9/2002 | Medwick et al. | | 428/432 |
| 2003/0180547 A1* | 9/2003 | Buhay et al. | | 428/434 |

FOREIGN PATENT DOCUMENTS

| | | |
|---|---|---|
| EP | 0 722 913 | 7/1996 |
| EP | 0 803 481 A2 | 10/1997 |
| GB | 2311540 | 10/1997 |
| WO | 99/15698 | 1/1999 |
| WO | 00/15576 | 12/2000 |
| WO | 01/38248 | 5/2001 |
| WO | WO-01/38248 * | 5/2001 |

OTHER PUBLICATIONS

U.S. Appl. No. 60/377,783, filed May 3, 2002.
U.S. Appl. No. 60/142,090, filed Jul. 2, 1999.
U.S. Appl. No. 10/428,481, filed May 2, 2003.
International Search Report Dated Sep. 15, 2003.

* cited by examiner

_US 7,910,229 B2_

SUBSTRATE HAVING THERMAL MANAGEMENT COATING FOR AN INSULATING GLASS UNIT

CROSS-REFERENCE TO RELATED APPLICATION

This application is a continuation application of U.S. patent application Ser. No. 10/428,481, filed on May 2, 2003, to Paul A. Medwick et al., for "SUBSTRATE HAVING THERMAL MANAGEMENT COATING FOR AN INSULATING GLASS UNIT", now abandoned, and claims the benefits of U.S. Provisional Application No. 60/377,783 filed May 3, 2002, which is herein incorporated by reference in its entirety.

BACKGROUND OF THE INVENTION

1. Field of the Invention

This invention relates generally to solar control coatings and, more particularly, to a coating that has solar control and spectral properties adaptable for use on a surface other than the inner surface of the outboard sheet (#2 surface) of a multi sheet-glazed insulating unit.

2. Description of the Currently Available Technology

Multi sheet-glazed insulating glass units ("IG units") having two or more spaced glass sheets are becoming the industry standard for residential and commercial architecture in geographic regions having cool to cold climates, e.g., those climates characterized by seasons requiring extensive periods of operating heating furnaces. The IG unit has improved thermal insulating performance over windows having single glass sheets due to its reduced conductive and convective transfer of heat compared to a conventional window. However, until fairly recently, the use of IG units has not been popular in geographic regions having warm to hot climates, e.g., those climates characterized by seasons requiring extensive periods of operating air conditioners, because the primary functionality required of windows in such regions is solar heat load reduction, not insulating value.

During the past several decades, solar-control coated glasses have been introduced into the market. Such solar-control coated glasses achieve significant levels of solar heat load reduction by decreasing the amount of solar energy (in the visible and/or near-infrared portions of the electromagnetic spectrum) that is directly transmitted through the coated glass, often by absorbing large amounts of the incident energy and/or by reflecting large amounts of visible light. More recently, certain high-performance silver-based low emissivity (low-E) coatings have been recognized as also having a significant degree of solar-control functionality in addition to their excellent thermal insulating properties. Such silver-based solar-control/low-E coated glasses are now becoming increasingly popular not only in climates characterized by long heating seasons (for their low-E/thermal insulating performance) but also in climates characterized by long cooling seasons such as the deep South, Southeastern, and Southwestern parts of the United States due to their solar-control benefits.

Today, the glazing industry desires to have window systems that have additional functionalities over and beyond thermal insulation and/or solar-control benefits (hereinafter referred to as "thermal management functionalities"). Examples of other such desired functionalities include aesthetics, safety, and ease of cleaning. For example, architects may desire to provide a wide range of colors for an IG unit to enhance the aesthetic appearance of a building. To achieve this goal, colored or tinted glass sheets can be used as the outer sheets of the IG unit. A solar control coating can be deposited on the inner surface of the outer tinted glass sheet (#2 surface of the IG unit) to provide solar control properties. An example of one suitable solar control coating is sold by PPG Industries, Inc. under the registered trademark Solarban® 60. The Solarban® 60 coating, which includes two infrared-reflecting films of silver, is discussed in U.S. Pat. No. 5,821,001.

While this standard practice of forming a solar control coating on the inner surface of the tinted glass sheet (#2 surface of the IG Unit) does provide acceptable IG units, there are some drawbacks to coating tinted glass sheets. For example, tinted glass is generally not made as often as clear glass and, therefore, may not be as readily available for coating if an architect desires a particular color for an outer pane of an IG unit in a short period of time. Moreover, if tinted glass is stockpiled in anticipation of coating, the tinted glass can develop surface deterioration or corrosion during storage. Such corrosion may not be apparent until after the tinted glass is coated and can make the coating appear mottled, stained, or otherwise unacceptable.

One technique to address the above-discussed drawbacks is to apply the solar control coating to an inner pane of a double glazed IG unit with an outer pane of an uncoated tinted glass sheet. U.S. Pat. No. 5,059,458 discloses a double glazed IG unit having an outer tinted glass sheet and an inner clear glass sheet having a silver layer on the outer surface of the clear glass sheet. However, this approach also has some drawbacks. For example, using a conventional solar control coating on the #3 surface of an IG unit (the outer surface of the inner glass sheet of a two pane IG unit) provides different solar-control performance of the overall IG unit than having the coating on the #2 surface of the IG unit (all other factors remaining the same). Specifically, putting the solar control coating on the #3 surface rather than the #2 surface results in a relative increase in the shading coefficient and a relative increase in the solar heat gain coefficient.

For example, for a reference IG unit (defined below), a conventional Solarban® 60 coating on the #2 surface can result in a luminous transmittance of 60%, a luminous exterior reflectance of 9% to 10%, a shading coefficient (ASHRAE summer conditions) of 0.35 to 0.36, and a solar heat gain coefficient (ASHRAE summer conditions) of 0.30 to 0.31. Switching the Solarban® 60 coating to the #3 surface changes the IG unit performance to a luminous transmittance of 60%, a luminous exterior reflectance of 11%, a shading coefficient (ASHRAE summer conditions) of 0.41, and a solar heat gain coefficient (ASHRAE summer conditions) of 0.36.

The performance of the Solarban® 60 coating has been well received in the IG unit field. Therefore, it would be advantageous to provide a coating, e.g., a solar control coating, that could be utilized on a surface of an inner pane of an IG unit (e.g., the #3 surface of a two pane IG unit) that provides similar solar control and/or aesthetic characteristics as those of the Solarban® 60 coating on the #2 surface of the IG unit to address at least some of the problems discussed above.

SUMMARY OF THE INVENTION

One embodiment of the present invention is a coating on clear glass which would be glazed in the inboard position of a double-glazed IG unit with the coating on the #3 surface such that, when combined with an uncoated tinted or clear outboard light (pane) in the IG unit, the IG unit has aesthetics and thermal management performance that are similar if not identical to IG units fabricated using a conventional solar control coating on the #2 surface of a clear or tinted glass sheet, respectively. As can be appreciated, the invention is not limited thereto. More particularly and not limiting to the invention, the coated clear glass substrates of the present invention can be used as an outboard light of an IG unit (i.e. with the thermal management coating of the invention in the #2 surface orientation) if the resultant aesthetics and thermal-management performance of such an IG unit configuration are acceptable for the particular use.

A coated article for use in an IG unit comprises a substrate and a coating formed over at least a portion of the substrate. The coating can comprise a first separation layer comprising at least one first dielectric layer; a first infrared reflective layer deposited over the first separation layer; a second separation layer comprising at least one dielectric layer deposited over the first infrared reflective layer; a second infrared reflective layer deposited over the second separation layer; a third separation layer comprising at least one dielectric layer deposited over the second infrared reflective layer; and a third infrared reflective layer deposited over the third separation. The coating can be positioned on the #2 or #3 surface of the IG unit after being mounted.

Another coated article for use in an IG unit can comprise a substrate and a coating formed over at least a portion of the substrate. The coating can comprise a first separation layer comprising at least one dielectric layer; a first infrared reflective layer formed over the first separation layer; a second separation layer comprising at least one dielectric layer formed over the first infrared reflective layer; and a second infrared reflective layer formed over the second separation layer. The coating can be positioned on the #2 or #3 surface of the IG unit after being mounted. The coating can provide a reference solar heat gain coefficient of less than or equal to 0.35.

An IG unit comprises a first pane defining a #1 and a #2 surface, at least one second pane defining a #3 and a #4 surface, and a coating formed over at least a portion of the #2 or #3 surface. The coating can comprise a first separation layer comprising at least one first dielectric layer; a first infrared reflective layer deposited over the first separation layer; a second separation layer comprising at least one dielectric layer deposited over the first infrared reflective layer; a second infrared reflective layer deposited over the second separation layer; a third separation layer comprising at least one dielectric layer deposited over the second infrared reflective layer; and a third infrared reflective layer deposited over the third separation layer.

Another IG unit comprises a first pane defining a #1 and a #2 surface, at least one second pane defining a #3 and a #4 surface, and a coating formed over at least a portion of the #2 or #3 surface. The coating can comprise a first separation layer comprising at least one first dielectric layer; a first infrared reflective layer deposited over the first separation layer; a second separation layer comprising at least one dielectric layer deposited over the first infrared reflective layer; and a second infrared reflective layer deposited over the second separation layer. The coating can provide a reference solar heat gain coefficient of less than or equal to 0.35.

DESCRIPTION OF THE PREFERRED EMBODIMENTS

Figure 1:
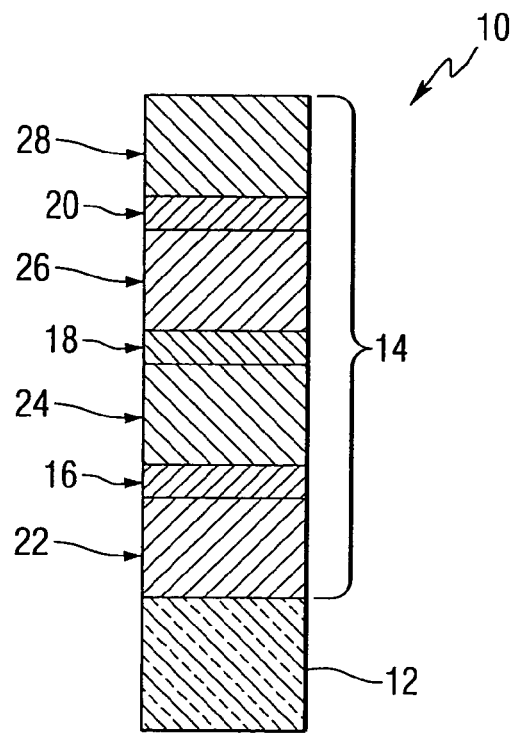
FIG. 1 is a side, sectional view (not to scale) of a coated article incorporating features of the invention.

As used herein, spatial or directional terms, such as "left", "right", "inner", "outer", "above", "below", "top", "bottom", and the like, relate to the invention as it is shown in the drawing figures. However, it is to be understood that the invention may assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 5.5 to 10. The terms "formed over", "deposited over", or "provided over" mean formed, deposited, or provided on but not necessarily in contact with the surface. For example, a coating layer "formed over" a substrate does not preclude the presence of one or more other coating layers or films of the same or different composition located between the formed coating layer and the substrate. All documents referred to herein are to be understood to be incorporated by reference in their entirety. Unless indicated otherwise, the "luminous" or "visible" region is in the wavelength range of 380 nanometers (nm) to 780 nm, the "infrared" (IR) region is in the wavelength range of 780 nm to 100,000 nm, and the "ultraviolet" (UV) region is in the wavelength range of 300 nm up to 380 nm. The term "optical thickness" means the product of a material's refractive index (dimensionless), referenced to about 550 nanometers (nm) in the visible region of the electromagnetic spectrum, times its physical thickness in Angstroms (A). As used herein, the term "solar control coating" refers to a coating that affects the solar properties of the coated article, such as but not limited to shading coefficient and/or emissivity and/or the amount of solar radiation reflected by and/or absorbed by and/or transmitted through the coated article, e.g., infrared or ultraviolet absorption or reflection. A solar control coating can block, absorb, or filter selected portions of the solar spectrum, such as but not limited to the visible spectrum.

An exemplary coating will first be described and then the use of the coating in a double pane IG unit will be described. However, it is to be understood that the invention is not limited to use with double pane IG units but could be practiced, for example, with single pane windows or multipane IG units having three or more panes.

With reference to FIG. 1, there is shown an exemplary coated article 10 incorporating features of the invention. The coated article 10 includes a substrate 12 having a coating 14.

In the broad practice of the invention, the substrate 12 can be of any desired material having any desired characteristics, such as opaque, translucent, or transparent to visible light. By "transparent" is meant having visible light transmittance through the substrate of greater than 0% up to 100%. Alternatively, the substrate can be translucent or opaque. By "translucent" is meant allowing electromagnetic energy (e.g., visible light) to pass through the substrate but diffusing this energy such that objects on the side of the substrate opposite to the viewer are not clearly visible. By "opaque" is meant having a visible light transmittance of 0%. Examples of suitable substrates include, but are not limited to, plastic substrates (such as acrylic polymers, such as polyacrylates; polyalkylmethacrylates, such as polymethylmethacrylates, polyethylmethacrylates, polypropylmethacrylates, and the like; polyurethanes; polycarbonates; polyalkylterephthalates, such as polyethyleneterephthalate (PET), polypropyleneterephthalates, polybutyleneterephthalates, and the like; polysiloxane containing polymers; or copolymers of any monomers for preparing these, or any mixtures thereof); metal substrates, such as but not limited to galvanized steel, stainless steel, and aluminum; ceramic substrates; tile substrates; glass substrates; or mixtures or combinations of any of the above. For example, the substrate can be conventional untinted soda-lime-silica-glass, i.e., "clear glass", or can be tinted or otherwise colored glass, borosilicate glass, leaded glass, tempered, untempered, annealed, or heat-strengthened glass. The glass may be of any type, such as conventional float glass or flat glass, and may be of any composition having any optical properties, e.g., any value of visible radiation transmission, ultraviolet radiation transmission, infrared radiation transmission, and/or total solar energy transmission. Types of glass suitable for the practice of the invention are described in, but are not to be considered as limited to, U.S. Pat. Nos. 4,746,347; 4,792,536; 5,240,886; 5,385,872; and 5,393,593. Further, the substrate can be a clear plastic and/or polymeric substrate with a coating of the invention deposited on the substrate's surface. In addition, the coating stack of the invention can be applied to a polymeric or plastic "web" or thin sheet that can be suspended inside an UG unit as is known in the art. In the latter case, the coated web would provide the dominant portion of the thermal-management benefits and the thermal-management coating would be on a substrate other than the glass or plastic substrates that comprise the primary boundary surfaces of the IG unit.

The exemplary coating 14 can be a multilayer coating stack. The terms "coating stack" or "coating" can include one or more layers and a "layer" can include one or more films. With reference to FIG. 1, the illustrated exemplary coating 14 includes three infrared reflective layers 16, 18 and 20. For ease of discussion the layer 16 is referred to as the first infrared reflective layer; the layer 18 is referred to as the second infrared reflective layer, and the layer 20 is referred to as the third (optional) infrared reflective layer. The illustrated coating 14 further includes separation layers 22, 24, 26 and 28. The separation layer 22 or first separation layer is between the substrate 12 and the first infrared reflective layer 16; the separation layer 24 or second separation layer is between the first infrared reflective layer 16 and the second infrared reflective layer 18; the separation layer 26 or third separation layer is between the second infrared reflective layer 18 and the third infrared reflective layer 20, and the fourth separation layer or outermost separation layer) 28 is between the third infrared reflective layer 20 and the environment. As can be appreciated by those skilled in the art, the invention contemplates more than three infrared reflective layers and more than four separation layers. Further, as will be noted below, the invention also contemplates less than three infrared reflective layers and less than four separation layers.

The coating 14 of the invention can be deposited over the substrate 12 by any conventional method, such as but not limited to spray pyrolysis, chemical vapor deposition (CVD), sol-gel, electron beam evaporation, or magnetron sputter vapor deposition (MSVD). In one embodiment, the coating 14 is deposited by MSVD.

The first separation layer 22 can include one or more dielectric (e.g., antireflective) layers or films and optionally one or more non-dielectric layers or films. As used herein a "non-dielectric layer or film" is a material that has mobile carriers of electric charge, such as metals, semiconductors, semimetals, alloys, mixtures, or combinations thereof. The dielectric layers or films can be any of the types known in the art, such as but not limited to, oxides, nitrides, and/or oxynitrides, such as but not limited to zinc oxide, zinc stannate, silicon nitride, silicon-aluminum nitride, ceramics, titanium dioxide, and/or of the types disclosed in U.S. Pat. Nos. 5,821, 001 and 5,942,338. The dielectric films can function to (1) provide a nucleation layer for overlying layers and/or films subsequently deposited, e.g., a subsequently deposited infrared reflective layer, and/or (2) to allow some control over the aesthetics and thermal-management performance of the coatings. The dielectric films can each include different dielectric materials with similar refractive indices or different materials with different refractive indices. The relative proportions of the dielectric films of the separation layers can be varied to optimize thermal-management performance, aesthetics, and/or durability of the coated article. Furthermore, any or all of the dielectric films of the separation layers can exhibit optical absorption in any region of the electromagnetic spectrum.

The non-dielectric layers or film(s) of the first separation layer (or subsequent separation layers) can be any of the types known in the art, such as but not limited to, titanium, copper, stainless steel, and can function (1) to protect the underlying films from damage and/or degradation during heat-treatment of the coated glass for those products designed and/or intended to be subjected to high-temperature processing after being coated, and/or (2) to enhance mechanical and/or chemical durability of the coated article's thin film optical stack, and/or (3) to contribute to and allow some control over the aesthetics and/or thermal-management performance of the coated article, e.g., by absorption. Any or all of the non-dielectric films can exhibit optical absorption in any region of the electromagnetic spectrum. The invention contemplates using the non-dielectric films of the separation layers over, under, and/or between the dielectric films(s). For example, but not limiting to the invention, non-dielectric films that can be used for optical absorption can be deposited on the substrate, between the dielectric films, or over the last deposited dielectric film of the first separation layer.

The first separation layer 22 can be a substantially single phase layer or film, such as a metal alloy oxide layer, e.g., zinc stannate or a mixture of phases composed of zinc and tin oxides, or can be composed of a plurality of layers or films, e.g., metal oxide films, such as those disclosed in U.S. Pat. Nos. 5,821,001; 4,898,789; and 4,898,790. In one embodiment, the first separation layer 22 comprises a multi-layer structure having a first metal oxide or alloy oxide layer or film (first dielectric layer) deposited over at least a portion of a major surface of the substrate 12 and a second metal oxide layer or film (second dielectric layer) deposited over at least a portion of the first metal alloy oxide film. In one embodiment, the first metal alloy oxide layer can be an oxide mixture or alloy oxide of zinc and tin. For example, the zinc/tin alloy can comprise zinc and tin in proportions of 10 wt. % to 90 wt. % zinc and 90 wt. % to 10 wt. % tin. One suitable metal alloy oxide for use in the invention is zinc stannate. The second metal oxide layer can comprise a zinc containing layer, such as zinc oxide. In one embodiment, the first metal alloy oxide layer can comprise an oxide of zinc and tin, e.g., zinc stannate, and can have a thickness in the range of 100 Angstroms (Å) to 500 Å, such as 150 Å to 400 Å, e.g., 200 Å to 350 Å, e.g., 250 Å to 350 Å. The second metal oxide layer can comprise zinc oxide and can have a thickness in the range of 50 Å to 200 Å, such as 75 Å to 150 Å, e.g., such as 100 Å to 150 Å, such as 130 Å to 160 Å.

In one embodiment, although not limiting to the invention, the total physical thickness of the dielectric film(s) of the first separation layer 22 can be in the range of 50 Å to 700 Å, such as in the range of 100 Å to 600 Å, such as in the range of 200 Å to 575 Å, such as 293 Å to 494 Å. The total physical thickness of the non-dielectric film(s) can be in the range of 0 Å to 500 Å, such as 0 Å to 400 Å, such as 0 Å to 300 Å, such as 0 Å to 50 Å, such as 0 Å to 30 Å. The first separation layer 22 can have a total physical thickness in the range of 50 Å to 1200 Å, such as in the range of 100 Å to 1000 Å, such as in the range of 200 Å to 875 Å, such as in the range of 250 Å to 500 Å.

The first infrared (IR)-reflective layer 16 can be deposited over the first separation layer 22 and can have a high reflectivity in the infrared (solar-infrared and/or thermal-infrared) portion of the electromagnetic spectrum, e.g., but not limiting to the invention, greater than 50%. The first infrared-reflective layer 16 can include one or more films of infrared-reflective materials, such as but not limited to, gold, copper, silver, or mixtures, alloys, or combinations thereof. In one embodiment of the invention, the first infrared reflective layer 16 comprises silver. The films can exhibit some reflectivity in the visible light portion of the electromagnetic spectrum. The first IR-reflective layer 16 (as well as the other IR-reflective layers) can (1) provide rejection of solar-infrared radiation and/or visible light to help control solar heat gain through the window and/or to control glare due to transmitted visible light; (2) when the infrared-reflective layer exhibits appreciable reflectivity in the thermal infrared portion of the electromagnetic spectrum e.g., but not limiting thereto greater than 50%, to impart some low-emissivity characteristics, e.g., but not limiting to the invention, an emissivity less than 0.25 to the coated article to inhibit radiative heat transfer across and/or through the IG unit, and/or (3) allow some control over the aesthetics of the coated article. Furthermore, any or all of the films of the infrared-reflective layers can exhibit optical absorption in any region of the electromagnetic spectrum.

In one embodiment, although not limiting to the invention, the thickness of the first infrared-reflective layer can be in the range of 5 Å to 200 Å, such as 10 Å to 200 Å, such as 50 Å to 200 Å, such as 75 Å to 175 Å, such as 75 Å to 150 Å, such as 93 Å to 109 Å. In one particular embodiment, the first infrared-reflective layer includes silver and has a thickness in the range of 100 Å to 150 Å, such as 110 Å to 140 Å, such as 120 Å to 130 Å.

Further, in the practice of the invention, when an additional infrared reflective layer, e.g. the second infrared-reflective layer 18, is to be provided, the second separation layer 24 can be provided. Otherwise, the outermost separation layer 28 discussed in detail below is applied over the first infra-red reflective layer 16.

The second separation layer 24 can be deposited over the first infrared-reflective layer 16 and can include one or more dielectric layers or films and/or one or more non-dielectric layers or films. As can be appreciated the dielectric layers or films and the non-dielectric layers or films of the second separation layer can be similar to or different than the material and number of the dielectric films and/or non-dielectric films of the first separation layer 22. In one practice, a non-dielectric film ("first non-dielectric film(s) of the second separation layer") can be deposited over the first IR reflective film 16. The first non-dielectric film can be a metal, such as but not limited to, titanium and is often referred to in the art as a "primer film" or "barrier film". The first non-dielectric film(s) of the second separation layer can (1) protect the underlying infrared-reflective layer from degradation (e.g. oxidation and/or plasma-induced damage) during: (A) deposition of overlying films, e.g., dielectric films of the second separation layer 24; and/or (B) heat-treatment of the coated article for those products that are designed/intended to be subjected to high-temperature processing after being coated; and/or (2) to contribute to and allow some control of the aesthetics and/or thermal-management performance of the coated article. The first non-dielectric film(s) of the second separation layer 24 can exhibit optical absorption in any region of the electromagnetic spectrum, if desired. Types of non-dielectric films that can be used in the practice of the invention include, but one not limited to, those disclosed in PCT/US00/15576.

One or more dielectric layers or films can be deposited over the first non-dielectric film(s) of the second separation layer 24, if present, otherwise over the first infrared-reflective layer 16. The dielectric films(s) of the second separation layer 24 can include one, two, or more films with similar refractive indices in a similar fashion as described for the dielectric films of the first separation layer 22. Furthermore, any or all of the dielectric films of the second separation layer 24 can exhibit optical absorption in any region of the electromagnetic spectrum. It is also believed that the dielectric film(s) of the second separation layer 24 provides some protection of the underlying layers and/or films from mechanical damage and/or chemical/environmental attack, degradation, or corrosion.

Optionally the second separation layer 24 can include other non-dielectric layers or film(s) ("other non-dielectric film(s) of the second separation layer") over, under or between the dielectric film(s) of the second separation layer 24. The other non-dielectric film(s) of the second separation layer 24 can be the same as and/or different material and number than the non-dielectric film(s) of the first separation layer 22. The relative proportions of the component films of the second separation layer 24 can be varied in order to optimize thermal-management performance, aesthetics, and/or chemical/mechanical durability of the coated article.

In one practice of the invention, although not limiting thereto, the first non-dielectric film(s) of the second separation layer can have a thickness in the range of 0 Å to 100 Å, such as 5 Å to 75 Å, such as 5 Å to 50 Å, such as 5 Å to 30 Å, such as 15 Å to 25 Å. In one particular embodiment, the first non-dielectric film can have a thickness in the range of 5 Å to 15 Å, such as 10 Å to 25 Å. If present, the other non-dielectric film(s) of the second separation layer 24 can have a thickness in the range of 0 Å to 500 Å, such as 0 Å to 400 Å, such as 0 Å to 300 Å.

The dielectric layers or film(s) of the second separation layer 24 can be in the range of 600 Å to 1000 Å, such as in the range of 700 Å to 900 Å, such as in the range of 725 Å to 875 Å, such as 739 Å to 852 Å. For example, the second separation layer 24 can have a thickness in the range of 600 Å to 1500 Å, such as in the range of 705 Å to 1375 Å, such as in the range of 730 Å to 1250 Å, such as 730 Å to 1230 Å. In one particular embodiment, the second separation layer 24 can be a multilayer structure having one or more metal oxide or metal alloy oxide layers or films, such as those described above with respect to the first separation layer 22. In one embodiment, the second separation layer 24 has a first metal oxide layer or film, e.g., a zinc oxide layer, deposited over the first primer film (first non-dielectric layer). A second metal alloy oxide layer or film, e.g., a zinc stannate layer, can be deposited over the first zinc oxide layer. A third metal oxide layer, e.g., another zinc oxide layer, can be deposited over the zinc stannate layer to form a multi-film second separation layer 24. In one particular embodiment, the first and third metal oxide layers of the second separation layer 24 can have a thickness in the range of 50 Å to 200 Å, e.g., 75 Å to 150 Å, e.g., 100 Å to 120 Å, e.g., 110 Å to 120 Å. The second metal alloy oxide layer can have a thickness in the range of 100 Å to 500 Å, e.g., 200 Å to 500 Å, e.g., 300 Å to 500 Å, e.g., 400 Å to 500 Å, e.g., 450 Å to 500 Å.

The second infrared-reflective (IR) layer 18 can be deposited over the second separation layer 24 and can include one or more films of infrared-reflective materials of the type referred to above for the first infrared-reflective layer 16. As can be appreciated the materials of the second infrared reflective layer can be the same or different than the materials of the first infrared reflective layer.

In one practice of the invention, although not limiting thereto, the thickness of the second infrared-reflecting layer can be in the range of 50 Å to 250 Å, such as 75 Å to 225 Å, such as 75 Å to 200 Å, such as 120 Å to 150 Å, such as 130 Å to 150 Å, such as 114 Å to 197 Å.

In the practice of the invention, when an additional infrared reflective layer, e.g., the third infrared-reflective layer 20, is to be provided in the coating 14, the third separation layer 26 is provided; otherwise the outermost separation layer 28 discussed in detail below can be applied over the second infrared-reflecting layer 18.

The third separation layer 26 can be deposited over the second infrared-reflective layer 18 and can include one or more dielectric layers or films and/or one or more non-dielectric layers or films, such as those described above. As can be appreciated, the dielectric films and the non-dielectric films of the third separation layer 26 can be similar to or different than the material and number of the dielectric films and/or non-dielectric films of the first and/or second separation layers 22, 24. In one practice of the invention, although not limiting thereto, the first non-dielectric film(s) of the third separation layer 26 can have a thickness in the range of 0 Å to 100 Å, such as 5 Å to 75 Å, such as 5 Å to 50 Å, such as 5 Å to 30 Å, such as 15 Å to 25 Å. In one particular embodiment, the first non-dielectric film can have a thickness in the range of 5 Å to 15 Å, such as 10 Å to 25 Å. If present, the other non-dielectric film(s) of the third separation layer 26 can have a thickness in the range of 0 Å to 500 Å, such as 0 Å to 400 Å, such as 0 Å to 300 Å.

One or more dielectric layers or films can be deposited over the first non-dielectric film(s) of the third separation layer 26, if present, otherwise over the second infrared-reflective layer 18. The relative proportions of the component films of the third separation layer may be varied in order to optimize thermal-management performance, aesthetics, and/or chemical/mechanical durability of the coated article.

In one embodiment, the dielectric film(s) of the third separation layer 26 can be in the range of 600 Å to 1000 Å, such as 625 Å to 900 Å, such as 650 Å to 875 Å, such as 729 Å to 764 Å. The third separation layer 26 can have a thickness in the range of 600 Å to 1600 Å, such as 630 Å to 1375 Å, such as 755 Å to 1250 Å, such as 730 Å to 1230 Å. In one embodiment, the third separation 26 can be a multi-layer structure similar to the second separation layer. For example, the third separation layer 26 can include a first metal oxide layer, e.g., a zinc oxide layer, a second metal alloy oxide layer, e.g., a zinc stannate layer over the first zinc oxide layer, and a third metal oxide layer, e.g., another zinc oxide layer, deposited over the zinc stannate layer. In one non-limiting embodiment, the first and third metal oxide layers can have thicknesses in the range of 50 Å to 200 Å, such as 75 Å to 150 Å, e.g., 100 Å to 120 Å, e.g., 100 Å. The metal alloy oxide layer can have a thickness in the range of 100 Å to 1,000 Å, e.g., 200 Å to 800 Å, e.g., 300 Å to 600 Å, e.g., 500 Å.

The third infrared-reflective (IR) layer 20 can be deposited over the third separation layer 26 and can include one or more films of infrared-reflective materials of the type referred to in the discussion regarding the first and/or second infrared-reflective layers 16, 18, respectively. As can be appreciated the material(s) of the third infrared reflective layer 20 can be the same or different than the material(s) of the first and/or second infrared reflective layers 16, 18.

In one practice of the invention, although not limiting thereto, the thickness of the third infrared-reflecting layer 20 can be in the range of 50 Å to 250 Å, such as 75 Å to 225 Å, such as 75 Å to 200 Å, such as 140 to 180 Å, such as 150 to 170 Å, such as 160 to 170 Å, such as 138 Å to 181 Å.

Further, in the practice of the invention, when an additional infrared reflective layer, e.g. a fourth infrared-reflective layer (not shown) similar to the first, second and/or third infrared-reflecting layers 16, 18 and 20, respectively, is to be provided in the coating 14, an additional separation layer (not shown) similar to the second and/or third separation layers 24 and 26, respectively, can be provided. Otherwise, the fourth or outermost separation layer 28 discussed in detail below can be applied over the third infrared-reflecting layer 16.

The outermost separation layer 28 can be deposited over the third infrared-reflective layer 20 and can include one or more dielectric layers or films and/or one or more non-dielectric layers or films. As can be appreciated the dielectric films and the non-dielectric films of the outermost separation layer can be similar to or different than the materials and number of the dielectric films and/or non-dielectric films of the first, second, and/or third separation layers 22, 24 and 26, respectively. In one practice, a first primer film or first non-dielectric film(s) of the outermost separation layer, such as titanium, can be deposited over the underlying infrared reflective layer, e.g. the third infrared-reflective layer 20. In one particular embodiment, the thickness of the first non-dielectric film(s) of the outermost separation layer can be in the range of 0 Å to 100 Å, such as 5 Å to 75 Å, such as 5 Å to 50 Å, such as 5 Å to 30 Å, such as 5 Å to 15 Å, such as 10 Å to 20 Å, such as 15 Å to 25 Å. If present, the other non-dielectric film(s) of the outermost separation layer 28 can have a thickness in the range of 0 Å to 500 Å, such as 0 Å to 400 Å, such as 0 Å to 300 Å.

One or more dielectric layers or films and one or more protective films can be deposited over the first non-dielectric film(s) of the outermost separation layer 28, if present, otherwise over the third infrared-reflective layer 20. The relative proportions of the component films of the outermost separation layer 28 can be varied in order to optimize thermal-management performance, aesthetics, and/or chemical/mechanical durability of the coated article. In one practice, the outermost separation layer 28 can have a thickness in the range of 170 Å to 600 Å, such as in the range of 205 Å to 500 Å, such as in the range of 235 Å to 430 Å. The thickness of any temporary overcoat (described below) is not included because it is removed before the product is used.

The dielectric film(s) of the outermost separation layer can be in the range of 100 Å to 400 Å, such as in the range of 150 Å to 350 Å, such as in the range of 175 Å to 325 Å, such as 206 Å to 310 Å. The outermost separation layer 28, excluding the protective film(s), can have a thickness in the range of 100 Å to 1000 Å, such as in the range of 155 Å to 725 Å, such as in the range of 180 Å to 675 Å, such as 185 Å to 705 Å. In one embodiment, the outermost separation layer 28 can be comprised of one or more metal oxide or metal alloy oxide containing layers or films such as those discussed above with respect to the first, second, or separation layers. In one embodiment, the outermost separation layer 28 is a multi-film layer having a first metal oxide layer or film, e.g., a zinc oxide layer or film, deposited over the third primer film and a second metal alloy oxide layer or film, e.g., a zinc stannate layer or film, deposited over the zinc oxide layer or film. The metal oxide layer or film can have a thickness in the range of 25 Å to 200 Å, such as 50 Å to 150 Å, such as 100 Å. The metal alloy oxide film can have a thickness in the range of 25 Å to 500 Å, e.g., 50 Å to 250 Å, e.g., 100 Å to 210 Å.

A permanent protective overcoat can be deposited over the outermost separation layer 28 to provide protection against mechanical and chemical attack. In one embodiment, the protective overcoat can be a metal oxide, such as titanium dioxide or zirconium oxide, having a thickness in the range of about 10 Å to 100 Å, e.g., 20 Å to 60 Å, e.g., 30 Å to 40 Å, such as 30 Å to 46 Å.

The inclusion of protective films as components of the outermost separation layer 28 is optional. The protective film(s) can protect the underlying layers from mechanical damage and/or chemical attack due to environmental exposure during storage, shipment, and processing of the coated article. The protective film(s) can also contribute to the aesthetics and/or thermal-management performance of the coated article. The protective film(s) can be one, two, or more films with similar refractive indices. Furthermore, any or all of the protective films can exhibit optical absorption in any region of the electromagnetic spectrum, if desired. The protective films can be of the durable type, which provide mechanical and chemical protection and remain on the outermost surface of the coating. These types of protective films are disclosed in U.S. Pat. No. 4,786,563. The protective films can be of the less durable type, e.g. zinc oxide.

Still further, a temporary protective film, such as commercially available fro PPG Industries, Inc. and identified by the trademark "TPO" and described in U.S. patent application Ser. Nos. 60/142,090 and 09/567,934 can be deposited over the permanent protective overcoat. The function of the temporary protective film is to provide additional protection of the underlying layers from mechanical damage during packaging, shipment, and downstream processing (e.g. unpacking, unloading, cutting, seaming/edging, edge deletion of the MSVD coating, and/or washing) of the coated article. The temporary film can be applied using an aqueous wet-chemical process after all MSVD coating layers have been deposited on the substrate and the MSVD-coated article has exited the MSVD coating chamber(s). The temporary film can serve as a sacrificial protective film and can be removed from the MSVD-coated article by contact of the article's coated surface with water (such as in the washing step normally employed in flat glass fabrication processes) prior to installation of the coated article in an IG unit or other product. In the following discussion, the aesthetic and thermal-management performance data pertaining to the present invention is made without the presence of the temporary film either because the temporary film has not been applied, and/or because the temporary film has already been removed. Further in the discussion of the thickness of the protective film(s) of the outermost layer, the temporary film is excluded for the reasons discussed.

Figure 2:
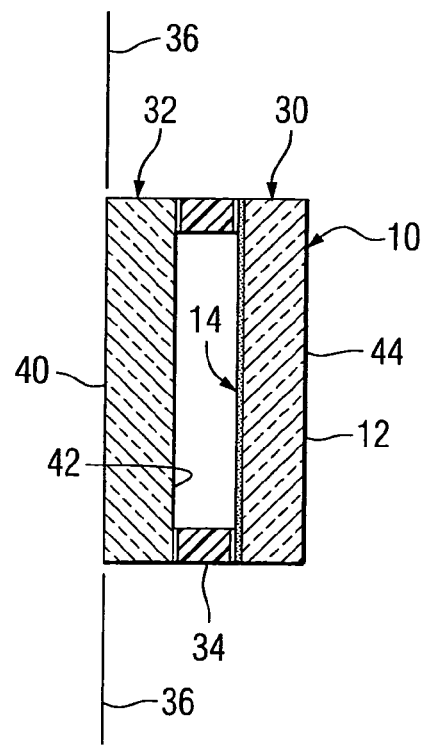
FIG. 2 is a side, sectional view (not to scale) of an IG unit incorporating features of the invention.

With reference to FIG. 2, there is shown an exemplary double glazed unit 30 having the coated article 10 (inner pane) incorporating features of the invention spaced from a sheet 32 (outer pane) by a spacer frame 34. The invention is not limited by the construction and method of fabricating the IG unit. For example but not limiting to the invention, the unit can be one or more of the types disclosed in U.S. Pat. No. 5,655,282. When the IG unit 30 is mounted in a building wall 36, the sheet 32 is the outer sheet and the coated article 10 is the inner sheet. Surface 40 of the sheet 32 is the outer surface of the outer sheet or the #1 surface. Surface 42 of the sheet 32 is the inner surface of the outer sheet 32 or the #2 surface. The surface 44 of the sheet 12 is the inner surface of the inner sheet or the #4 surface. The opposite surface of the sheet 12 is the outer surface of the inner sheet 12 and has the coating 14 and is the #3 surface. As can be appreciated the invention is not limited to the manner the IG unit is mounted in a sash, wall fenestration or any opening of a structure. Further, the glass sheets can be mounted in a sash or window frame, e.g., as disclosed in PCT/US99/15698.

The coating of the invention can provide reference IG unit values as follows. The "reference IG unit values" or "reference values" are those values calculated from the measured spectral properties of the coating for a "reference IG unit" using WINDOW 4.1 fenestration software available from Lawrence Berkeley National Laboratory. The reference IG unit is defined as a dual pane unit having an outer pane of 6 mm SOLEXIA® glass commercially available from PPG Industries, Inc. and an inner pane of clear glass commercially available from PPG Industries, Inc separated by a distance of 0.5 inch (1.27 cm) by an air gap and with the coating on the #3 surface.

SOLEXIA® glass is a subset of tinted glasses and typically has the following properties for a nominal 6 mm monolithic piece: a luminous transmittance of 75% to 80%, a luminous reflectance of 7% to 8% and a total solar absorption of 46% to 48%. The clear glass typically has a luminous transmittance above 85%, a luminous reflectance of 7% to 9%, and a total solar absorption of 15% to 16%. A clear monolithic piece of glass having a thickness of about 6 mm has the following properties: a luminous transmittance of above 85%, a luminous reflectance of 7% to 9%, and a total solar absorption of 15% to 16%.

Unless indicated otherwise, the SOLEXIA® glass referred to in the discussion of the invention and used in the Examples for a monolithic piece in the range of 5.5 mm to 6 mm had the following properties: a nominal luminous transmittance of 76.8%, a nominal luminous reflectance of 7.5%, a nominal total solar absorption of 47.2%, a transmitted color of $L^*T$ of 90.4, $a^*T$ of $-7.40$, $b^*T$ of 1.16; and reflected color of $L^*R$ of 33.1, $a^*R$ of $-2.70$, $b^*R$ of $-0.50$. Unless indicated otherwise, the clear glass referred to in the discussion of the invention and used in the Examples for a monolithic piece in the range of 5.5 to 6 mm had the following properties; a nominal luminous transmittance of 88.5%, a nominal luminous reflectance of 8.5%, a nominal total solar absorption of 15.8%, transmitted color of L*T of 95.4, a*T of −1.80, b*T of 0.12; and reflected color of L*R of 35.0, a*R of −0.80, b*R of −1.00.

The color values herein are those determinable by the CIELAB 1976 (L*, a*, b*) system, Illuminant D65, 10 degree observer. Quoted solar properties correspond to the Lawrence Berkeley National Laboratory's WINDOW 4.1 wavelength range and integration (trapezoidal) scheme. The shading coefficient (SC) and solar heat gain coefficient (SHGC) for a reference IG unit were calculated under ASHRAE standard assumed summer conditions (exterior environment temperature of 89° F., interior environment temperature of 75° F., wind speed of 7.50 miles/hour (windward directed), solar load of 248.2 Btu/hour-ft$^2$, sky temperature of 89° F., sky emissivity of 1.00). "LSG" is an abbreviation for "Light-to-Solar Gain" ratio and is equal to the ratio of the luminous transmittance (expressed as a decimal) to the solar heat gain coefficient (SHGC). As will be appreciated by one skilled in the art, TSET is total solar energy transmitted, TSER1 is total solar energy reflected from the coated surface, and TSER2 is total solar energy reflected from the uncoated surface.

In one embodiment, the coating 14 can provide reference IG unit values (i.e., calculated values for the coating in a reference IG unit) as follows: reference visible light transmittance in the range of 40% to 70%, such as 50% to 65%, such as 50% to 60%. The coating can provide a reference transmitted color having a transmitted a* (a*T) in the range of −5 to −12, such as −7 to −11, such as −8 to −11, such as −9 to −10. The coating can provide a transmitted b* (b*T) in the range of 0 to 5, such as 1 to 5, such as 2 to 5, such as 2.5 to 5, such as 3 to 5, such as 4 to 5. The coating can provide an exterior visible light reflectance (Rext vis) in the range of greater than 0% to less than 20%, such as 5% to 15%, such as 6% to 11%, such as 8% to 11%, such as 8% to 10%. The coating 14 can provide a reference reflected exterior a* (Rexta*) in the range of −2 to −8, such as −2 to −7, such as −3 to −6, such as −3 to −5. The coating can provide a reference reflected exterior b* (Rextb*) in the range of 0 to −5, such as 0 to −4, such as 0 to −3, such as −1 to −3. The coating can provide a reference shading coefficient in the range of 0.25 to 0.45, such as 0.3 to 0.4, such as 0.35 to 0.37, such as less than or equal to 0.41, such as less than or equal to 0.37, such as less than or equal to 0.36, such as less than or equal to 0.35, such as less than or equal to 0.33, such as less than or equal to 0.32, such as less than or equal to 0.31. The coating can provide a reference solar heat gain coefficient in the range of 0.2 to 0.4, such as 0.3 to 0.4, such as 0.3 to 0.35, such as 0.3 to 0.32, such as than or equal to 0.36, such as less than or equal to 0.35, such as less than or equal to 0.33, such as less than or equal to 0.32, such as less than or equal to 0.31.

Illustrating the invention are the following Examples which, however, are not to be considered as limiting the invention to their details. All parts and percentages in the following examples, as well as throughout the specification are by weight unless otherwise indicated.

EXAMPLES

In the following Examples, the coatings were deposited using an in-line magnetron sputter deposition system Model No. ILS 1600 sold by Airco Temescal on a 6 mm clear glass sheet. Quoted thermal management performance values correspond to center-of-glass (COG) values only; edge effects due to the spacer and frame are not included. The luminous transmittance and the luminous exterior reflectance were measured using a Lamda 9 Spectrophotometer and were determined using the WINDOW 4.1 fenestration simulation software, available from Lawrence Berkeley National Laboratory (LBNL). Emissivity was determined by measurements using an Emissivity Mattson Galaxy 5030 FTIR infrared spectrophotometer in accordance with ASTM E-1585-93 with intervals for infrared integration over wavelength range of 5-40 microns. Color data reference the CIELAB 1976 (L*,a*,b*) system, Illuminant D65, 10 degree observer. Quoted solar properties correspond to the Lawrence Berkeley National Laboratory's WINDOW 4.1 wavelength range and integration (trapezoidal) scheme. R-Sheet is electrical sheet resistance of the sample's coated surface as measured with a four-point probe. The shading coefficient (SC) and solar heat gain coefficient (SHGC) of the IG unit were calculated under ASHRAE standard assumed summer conditions (exterior environment temperature of 89° F., interior environment temperature of 75° F., wind speed of 7.50 miles/hour (windward directed), solar load of 248.2 Btu/hour-ft2, sky temperature of 89° F., sky emissivity of 1.00). Unless indicated otherwise, the coated glass sheet had a nominal thickness of 6 millimeters (mm). Because the lateral dimensions do not have any bearing on the COG properties, they are not discussed regarding COG properties.

The "IG unit performance" data were calculated from the measured spectral properties of the coatings for a "reference IG unit" as described above using WINDOW 4.1 fenestration software available from Lawrence Berkeley National Laboratory.

Example 1

Sample 1 Included

A first separation layer 22 having a dielectric film of an oxide of an alloy of 54% zinc and 46% tin (by weight) deposited on a clear glass substrate. The dielectric film had physical thickness estimated to be about 341 Å (34.1 nanometers, nm);

A first infrared-reflective layer 16 deposited on the first separation layer was a metallic silver (Ag) having a physical thickness of the silver layer estimated to be about 123 Å (12.3 nm);

A second separation layer 24 included a primer film of metallic titanium (Ti) having a physical thickness estimated to be about 15 Å (1.5 nm) deposited on the silver film of the first infrared-reflective layer 16 and a dielectric film of an oxide of an alloy of 54% zinc:46% tin (by weight) having a physical thickness estimated to be about 808 Å (80.8 nm) deposited on the primer film;

A second infrared-reflective layer 18 was metallic silver (Ag) having a thickness estimated to be about 172 Å (17.2 nm) deposited on the dielectric film of the second separation layer;

An outermost separation layer 28 included a primer film of metallic titanium (Ti) having a physical thickness of about 15 Å (1.5 nm) deposited on the second infrared-reflecting layer, a film of an oxide of an alloy of 54% zinc:46% tin (by weight) having a physical thickness estimated to be about 244 Å (24.4 nm), and protective overcoat film of an oxide of titanium (Ti) having a physical thickness of estimated to be about 30 Å (3 nm) deposited on the dielectric film.

The coated monolithic sheet of sample 1 had the properties, among others, detailed in Table 3.

TABLE 3

| Sample ID | Transmitted Color Data | | | Coated Surface Reflected Color Data | | | Glass Surface Reflected Color Data | | | Solar Performance Data | | | Emissivity | $R_{sheet}$ (ohms/sq) |
|---|---|---|---|---|---|---|---|---|---|---|---|---|---|---|
| | L* | a* | b* | L* | a* | b* | L* | a* | b* | TSET (%) | TSER1 (%) | TSER2 (%) | | |
| 1 | 86.44 | −2.41 | 4.40 | 45.45 | −12.73 | −4.67 | 44.39 | −11.77 | −12.40 | 30.55 | 53.45 | 31.84 | 0.035 | 1.9 |

The spectrophotometric data of Sample 1 was used as input to the WINDOW 4.1 fenestration simulation software to determine the calculated reference IG unit performance in Table 4. The designations having a "T", such as "a*T" refer to the transmitted property and those designation having an "R" refer to the reflected property.

TABLE 4

IG Unit Performance Calculated from Spectral Properties

| Sample ID | IG unit configuration | coated surface | Luminous Transmittance (%) | a*T | b*T | Luminous Exterior Reflectance C %) | a*Rext | b*Rext | shading coefficient, SC (unitless) | solar heat gain coefficient, SHGC (unitless) | LSG |
|---|---|---|---|---|---|---|---|---|---|---|---|
| 1 | outer light = 6 mm SOLEXIA ®, inner light = 6 mm CLEAR | #3 | 53.7 | −8.90 | 4.90 | 16.5 | −13.00 | −1.80 | 0.36 | 0.31 | 1.73 |

Example 2

Sample 2 Included

A first separation layer 22 having a dielectric film of an oxide of an alloy of 54% zinc:46% tin (by weight) having a physical thickness estimated to be about 378 Å (37.8 nm) deposited on a clear glass substrate;

A first infrared-reflecting layer 16 having a metallic silver (Ag) film having a physical thickness estimated to be about 93 Å (9.3 nm) deposited on the dielectric film of the first separation layer;

A second separation layer 24 having a primer film of deposited metallic titanium (Ti) having a physical thickness estimated to be about 15 Å (1.5 nm) deposited on the first infrared-reflecting layer, a dielectric film of an oxide of an alloy of 54% zinc:46% tin (by weight) having a physical thickness of estimated to be about 739 Å (73.9 nm) deposited on the primer film, A second infrared-reflective layer 18 having a metallic silver (Ag) having a physical thickness of estimated to be about 114 Å (11.4 nm) deposited on the dielectric film of the second separation layer;

A third separation layer 26 having a primer film deposited as metallic titanium (Ti) having a physical thickness estimated to be about 15 Å (1.5 nm) deposited on the second infrared-reflecting layer 18, and a dielectric film of an oxide of an alloy of 54% zinc: 46% tin (by weight) having a physical thickness estimated to be about 729 Å (72.9 nm) deposited on the primer layer of the third separation layer 26;

A third infrared-reflective layer having a metallic silver (Ag) having a physical thickness estimated to be about 138 Å (13.8 nm) deposited on the dielectric film of the third separation layer, and An outermost separation layer 28 having a primer film deposited as metallic titanium (Ti) having a physical thickness estimated to be about 15 Å (1.5 nm) deposited on the third infrared reflecting layer, a dielectric film of an oxide of an alloy of 54% zinc:46% tin (by weight) having a physical thickness estimated to be about 262 Å (26.2 nm) deposited on the primer layer, and a protective film of an oxide of titanium (Ti) having a physical thickness estimated to be about 30 Å (3 nm) deposited on the dielectric film of the outermost separation layer 28.

Sample 2 had the properties detailed in following Tables 5 and 6.

TABLE 5

| Sample ID | Transmitted Color Data | | | Coated Surface Reflected Color Data | | | Glass Surface Reflected Color Data | | | Solar Performance Data | | | Emissivity | $R_{sheet}$ (ohms/sq) |
|---|---|---|---|---|---|---|---|---|---|---|---|---|---|---|
| | L* | a* | b* | L* | a* | b* | L* | a* | b* | TSET (%) | TSER1 (%) | TSER2 (%) | | |
| 2 | 84.49 | −2.29 | 8.15 | 49.83 | −14.85 | −10.77 | 48.16 | −16.09 | −19.34 | 25.64 | 60.65 | 37.34 | 0.031 | 1.8 |

TABLE 6

IG Unit Performance Calculated from Spectral Properties of Example 2

| Sample ID | IG unit configuration | coated surface | Luminous Transmittance (%) | a*T | b*T | Luminous Exterior Reflectance (%) | a*Rext | b*Rext | shading coefficient, SC (unitless) | solar heat gain coefficient, SHGC (unitless) | LSG |
|---|---|---|---|---|---|---|---|---|---|---|---|
| Example2 | outer light = 6 mm SOLEXIA ®, inner light = 6 mm CLEAR | #3 | 51.0 | −8.60 | 8.14 | 18.4 | −16.00 | −5.50 | 0.33 | 0.28 | 1.82 |

Example 3

Sample 3 Included

A first separation layer 22 having a dielectric film of an oxide of an alloy of 54% zinc:46% tin (by weight) deposited on the glass substrate. The dielectric film had physical thickness estimated to be about 336 Å (33.6 nanometers, nm);

A first infrared-reflective layer 16 deposited on the first separation layer was a metallic silver (Ag) having a physical thickness of the silver layer estimated to be about 111 Å (11.1 nm);

A second separation layer 24 having a primer film of metallic titanium (Ti) having a physical thickness estimated to be about 15 Å (1.5 nm) deposited on the silver film of the first infrared-reflective layer 16 and a dielectric film of an oxide of an alloy of 54% zinc:46% tin (by weight) having a physical thickness estimated to be about 842 Å (84.2 nm) deposited on the primer film;

A second infrared-reflective layer 18 was metallic silver (Ag) having a thickness estimated to be about 161 Å (16.1 nm) deposited on the dielectric film of the second separation layer;

An outermost separation layer 28 included a primer film of metallic titanium (Ti) having a physical thickness of about 15 Å (1.5 nm) deposited on the second infrared-reflecting layer, a film of an oxide of an alloy of 54% zinc:46% tin (by weight) having a physical thickness estimated to be about 245 Å (24.5 nm), and protective film of an oxide of titanium (Ti) having a physical thickness of estimated to be about 30 Å (3 nm) deposited on the dielectric film.

Sample 3 had properties as detailed in Tables 7 and 8.

Example 4

Sample 4 Included

A first separation layer 22 having a dielectric film of an oxide of an alloy of 54% zinc:46% tin (by weight) deposited on the glass substrate. The dielectric film had physical thickness estimated to be about 293 Å (29.3 nanometers, nm);

A first infrared-reflective layer 16 of metallic silver (Ag) deposited on the first separation layer having a physical thickness of the silver layer estimated to be about 113 Å (11.3 nm);

A second separation layer 24 having a primer film of metallic titanium (Ti) having a physical thickness estimated to be about 15 Å (1.5 nm) deposited on the silver film of the first infrared-reflective layer 16 and a dielectric film of an oxide of an alloy of 54% zinc:46% tin (by weight) having a physical thickness estimated to be about 851 Å (85.1 nm) deposited on the primer film;

A second infrared-reflective layer 18 of metallic silver (Ag) having a thickness estimated to be about 197 Å (19.7 nm) deposited on the dielectric film of the second separation layer;

An outermost separation layer 28 having a primer film of metallic titanium (Ti) having a physical thickness of about 15 Å (1.5 nm) deposited on the second infrared-reflecting layer, a film of an oxide of an alloy of 54% zinc:46% tin (by weight) having a physical thickness estimated to be about 245 Å (24.5 nm), and protective overcoat film of an oxide of titanium (Ti) having a physical thickness of estimated to be about 30 Å (3 nm) deposited on the dielectric film.

TABLE 7

| Sample ID | Transmitted Data color | | | Coated Surface Reflected Color Data | | | Glass Surface Reflected Color Data | | | Solar Performance Data | | | Emissivity | $R_{sheet}$ (ohms/sq) |
|---|---|---|---|---|---|---|---|---|---|---|---|---|---|---|
| | L* | a* | b* | L* | a* | b* | L* | a* | b* | TSET (%) | TSER1 (%) | TSER2 (%) | | |
| 3 | 85.85 | −2.63 | 1.03 | 42.76 | −12.80 | 1.40 | 41.50 | −15.49 | −7.00 | 29.24 | 54.18 | 29.60 | 0.033 | 2.26 |

TABLE 8

IG Unit Performance Calculated from Spectral Properties of Example 3.

| Sample ID | IG unit configuration | coated surface | Luminous Transmittance (%) | A*T | B*T | Luminous Exterior Reflectance (%) | a*Rext | b*Rext | shading coefficient, SC (unitless) | solar heat gain coefficient, SHGC (unitless) | LSG |
|---|---|---|---|---|---|---|---|---|---|---|---|
| 3 | outer light = 6 mm SOLEXIA ®, inner light = 6 mm CLEAR | #3 | 52.6 | −8.90 | 2.05 | 15.4 | −13.00 | 1.18 | 0.36 | 0.31 | 1.70 |

Sample 4 had properties detailed in Tables 9 and 10.

TABLE 9

| Sample ID | Transmitted Color Data | | | Coated Surface Reflected Color Data | | | Glass Surface Reflected Color Data | | | Solar Performance Data | | | Emissivity | $R_{sheet}$ (ohms/sq) |
|---|---|---|---|---|---|---|---|---|---|---|---|---|---|---|
| | L* | a* | b* | L* | a* | b* | L* | a* | b* | TSET (%) | TSER1 (%) | TSER2 (%) | | |
| 4 | 83.34 | −3.63 | 2.43 | 51.22 | −7.65 | 1.27 | 48.20 | −15.21 | −11.49 | 25.26 | 60.97 | 32.76 | 0.031 | 1.89 |

TABLE 10

IG Unit Performance Calculated from Spectral Properties of Sample 4

| Sample ID | IG unit configuration | coated surface | Luminous Transmittance (%) | a*T | b*T | Luminous Exterior Reflectance (%) | a*Rext | b*Rext | shading coefficient, SC (unitless) | solar heat gain coefficient, SHGC (unitless) | LSG |
|---|---|---|---|---|---|---|---|---|---|---|---|
| 4 | outer light = 6 mm SOLEXIA ®, inner light = 6 mm CLEAR | #3 | 49.1 | −9.60 | 3.30 | 19.2 | −12.00 | 1.28 | 0.33 | 0.28 | 1.75 |

Example 5

Sample 5 Included

A first separation layer 22 having a dielectric film of an oxide of an alloy of 54% zinc:46% tin (by weight) deposited on a 2.3 millimeter thick clear glass substrate having a thickness of 2.5 mm. The dielectric film had physical thickness estimated to be about 319 Å (31.9 nanometers, nm);

A first infrared-reflective layer 16 of a metallic silver (Ag) deposited on the first separation layer had a physical thickness estimated to be about 114 Å (11.4 nm);

A second separation layer 24 having a primer film of metallic titanium (Ti) having a physical thickness estimated to be about 15 Å (1.5 nm) deposited on the silver film of the first infrared-reflective layer 16 and a dielectric film of an oxide of an alloy of 54% zinc:46% tin (by weight) having a physical thickness estimated to be about 845 Å (84.5 nm) deposited on the primer film;

A second infrared-reflective layer 18 having metallic silver (Ag) having a thickness estimated to be about 170 Å (17.0 nm) deposited on the dielectric film of the second separation layer;

An outermost separation layer 28 having a primer film of metallic titanium (Ti) having a physical thickness of about 15 Å (1.5 nm) deposited on the second infrared-reflecting layer, a film of an oxide of an alloy of 54% zinc:46% tin (by weight) having a physical thickness estimated to be about 257 Å (25.7 nm), and protective overcoat film of an oxide of titanium (Ti) having a physical thickness of estimated to be about 30 Å (3 nm) deposited on the dielectric film.

Sample 5 had properties shown on Tables 11 and 12.

TABLE 11

| Sample ID | Transmitted Color Data | | | Coated Surface Reflected Color Data | | | Glass Surface Reflected Color Data | | | Solar Performance Data | | | Emissivity | $R_{sheet}$ (ohms/sq) |
|---|---|---|---|---|---|---|---|---|---|---|---|---|---|---|
| | L* | a* | b* | L* | a* | b* | L* | a* | b* | TSET (%) | TSER1 (%) | TSER2 (%) | | |
| 5 | 87.59 | −2.54 | 2.01 | 41.74 | −10.82 | −1.92 | 40.98 | −12.68 | −11.60 | 30.48 | 55.57 | 42.20 | 0.035 | 2.06 |

TABLE 12

IG Unit Performance Calculated from Spectral Properties

| Sample ID | IG unit configuration | coated surface | Luminous Trans mittance (%) | a*T | b*T | Luminous Exterior Reflectance (%) | a*Rext | b*Rext | shading coefficient, SC (unitless) | solar heat gain coefficient, SHGC (unitless) | LSG |
|---|---|---|---|---|---|---|---|---|---|---|---|
| 5 | outer light = 6 mm SOLEXIA ®, inner light = 2.3 mm CLEAR | #3 | 55.3 | −8.90 | 2.88 | 14.9 | −12.00 | −0.60 | 0.36 | 0.31 | 1.78 |

Example 6

Sample 6 Included

A first separation layer 22 having included a first dielectric film of an oxide of an alloy of 54% zinc:46% tin (by weight) deposited on a glass substrate having a thickness of about 2.3 millimeters; the dielectric film had physical thickness estimated to be about 240 Å (24.0 nanometers, rim), a second dielectric film of an oxide of an alloy of 90% zinc:10% tin (by weight) deposited on the first dielectric layer; the second dielectric film had physical thickness estimated to be about 80 Å(8.0 nanometers, nm) providing dielectric films having a combined thickness of 320 Å (32.0 nm);

A first infrared-reflective layer 16 of metallic silver (Ag) deposited on the first separation layer having a physical thickness estimated to be about 114 Å (11.4 nm);

A second separation layer 24 having a primer film of metallic titanium (Ti) having a physical thickness estimated to be about 25 Å (2.5 rim) deposited on the silver film of the first infrared-reflective layer 16 and a first dielectric film of an oxide of an alloy of 90% zinc:10% tin (by weight) deposited on the primer film of the second separation layer; the first dielectric film had physical thickness estimated to be about 84 Å (8.4 nanometers, nm) a second dielectric film of an oxide of an alloy of 54% zinc:46% tin (by weight) deposited on the first dielectric film; the second dielectric film had physical thickness estimated to be about 676 Å (67.6 nanometers, nm), a third dielectric film of an oxide of an alloy of 90% zinc:10% tin (by weight) deposited on the second dielectric layer; the third dielectric film had physical thickness estimated to be about 84 Å (8.4 nanometers, nm) providing three dielectric films having a combined physical thickness estimated to be about 844 Å (84.4 nm);

A second infrared-reflective layer 18 of metallic silver (Ag) having a thickness estimated to be about 170 Å (17.0 nm) deposited on the third dielectric film of the second separation layer;

An outermost separation layer 28 having a primer film of metallic titanium (Ti) having a physical thickness of about 25 Å (2.5 nm) deposited on the second infrared-reflecting layer, a first dielectric film of an oxide of an alloy of 90% zinc:10% tin (by weight) deposited on the primer film of the outermost separation layer; the first dielectric film had physical thickness estimated to be about 85 Å (8.5 nanometers, nm), a second dielectric film of an oxide of an alloy of 54% zinc:46% tin (by weight) deposited on the first dielectric film; the second dielectric film had physical thickness estimated to be about 172 Å (17.2 nanometers, nm), the first and second dielectric films having a combined physical thickness estimated to be about 257 Å (25.7 nm), and a protective overcoat film of an oxide of titanium (Ti) having a physical thickness of estimated to be about 30 Å (3 nm) deposited on the dielectric film.

The piece of the monolithic coated glass of Sample 6, having lateral dimensions of approximately 4 inch×4 inch and nominal thickness of 2.3 millimeters, had properties as detailed in Tables 13 and 14 after it was heated in a box oven (1300° F. oven temperature setpoint) for approximately 3 minutes, then removed from the oven and subsequently allowed to cool to room temperature in ambient air. The lateral dimensions of Sample 6 were presented because the sample was heat-treated and the dimensions are of interest.

Sample 6 had properties shown on Tables 13 and 14.

TABLE 13

| Sample ID | Transmitted Color Data | | | Coated Surface Reflected Color Data | | | Glass Surface Reflected Color Data | | | Solar Performance Data | | | Emissivity | $R_{sheet}$ (ohms/sq) |
|---|---|---|---|---|---|---|---|---|---|---|---|---|---|---|
| | L* | a* | b* | L* | a* | b* | L* | a* | b* | TSET (%) | TSER1 (%) | TSER2 (%) | | |
| 6 (after heating) | 89.60 | −0.79 | 3.93 | 41.41 | −12.04 | 0.80 | 39.83 | −9.51 | −10.76 | 33.11 | 56.28 | 44.54 | 0.029 | 1.26 |

TABLE 14

IG Unit Performance Calculated from Spectral Properties of Example 6 (after heating)

| Sample ID | IG unit configuration | coated surface | Luminous Transmittance (%) | a*T | b*T | Luminous Exterior Reflectance (%) | a*Rext | b*Rext | shading coefficient, SC (unitless) | solar heat gain coefficient, SHGC (unitless) | LSG |
|---|---|---|---|---|---|---|---|---|---|---|---|
| 6 (after heating) | outer light = 6 mm SOLEXIA ®, inner light = 2.3 mm CLEAR | #3 | 58.8 | −7.50 | 4.64 | 14.9 | −12.00 | 0.90 | 0.36 | 0.31 | 1.90 |

Example 7

Sample 7 Included

A first separation layer 22 having a first dielectric film of an oxide of an alloy of 54% zinc:46% tin (by weight) deposited on a 4×4 inch 2.3 mm glass substrate; the dielectric film had physical thickness estimated to be about 302 Å (30.2 nanometers, nm), a second dielectric film of an oxide of an alloy of 90% zinc:10% tin (by weight) deposited on the first dielectric layer; the second dielectric film had physical thickness estimated to be about 75 Å (7.5 nanometers, nm) providing dielectric films having a combined physical thickness estimated to be 377 Å (37.7 nm);

A first infrared-reflective layer 16 deposited on the first separation layer was a metallic silver (Ag) having a physical thickness of the silver layer estimated to be about 93 Å (9.3 nm);

A second separation layer 24 having a primer film of metallic titanium (Ti) having a physical thickness estimated to be about 25 Å (2.5 nm) deposited on the silver film of the first infrared-reflective layer 16 and a first dielectric film of an oxide of an alloy of 90% zinc:10% tin (by weight) deposited on the primer film of the second separation layer; the first dielectric film had physical thickness estimated to be about 74 Å (7.4 nanometers, nm) a second dielectric film of an oxide of an alloy of 54% zinc:46% tin (by weight) deposited on the first dielectric film; the second dielectric film had physical thickness estimated to be about 591 Å (59.1 nanometers, nm), a third dielectric film of an oxide of an alloy of 90% zinc:10% tin (by weight) deposited on the second dielectric layer; the third dielectric film had physical thickness estimated to be about 74 Å (7.4 nanometers, nm) providing three dielectric films having a combined physical thickness estimated to be about 739 Å (73.9 nm);

A second infrared-reflective layer 18 was metallic silver (Ag) having a thickness estimated to be about 114 Å (11.4 nm) deposited on the third dielectric film of the second separation layer;

A third separation layer 26 having a primer film of metallic titanium (Ti) having a physical thickness estimated to be about 25 Å (2.5 nm) deposited on the silver film of the second infrared-reflective layer 18 and a first dielectric film of an oxide of an alloy of 90% zinc:10% tin (by weight) deposited on the primer film of the second separation layer; the first dielectric film had physical thickness estimated to be about 73 Å (7.3 nanometers, nm) a second dielectric film of an oxide of an alloy of 54% zinc:46% tin (by weight) deposited on the first dielectric film; the second dielectric film had physical thickness estimated to be about 583 Å (58.3 nanometers, nm), a third dielectric film of an oxide of an alloy of 90% zinc:10% tin (by weight) deposited on the second dielectric layer; the third dielectric film had physical thickness estimated to be about 73 Å (7.3 nanometers, nm) providing three dielectric films having a combined physical thickness estimated to be about 729 Å (72.9 nm);

A third infrared-reflective layer 20 was metallic silver (Ag) having a thickness estimated to be about 138 Å (13.8 nm) deposited on the third dielectric film of the third separation layer 26;

An outermost separation layer 28 having a primer film of metallic titanium (Ti) having a physical thickness of about 25 Å (2.5 nm) deposited on the third infrared-reflecting layer, a first dielectric film of an oxide of an alloy of 90% zinc:10% tin (by weight) deposited on the primer film of the outermost separation layer; the first dielectric film had physical thickness estimated to be about 87 Å (8.7 nanometers, nm), a second dielectric film of an oxide of an alloy of 54% zinc:46% tin (by weight) deposited on the first dielectric film; the second dielectric film had physical thickness estimated to be about 175 Å (17.5 nanometers, nm), the first and second dielectric films having a combined physical thickness estimated to be about 262 Å (26.2 nm), and a protective overcoat film of an oxide of titanium (Ti) having a physical thickness of estimated to be about 30 Å (3 nm) deposited on the dielectric film.

Sample 7 had properties detailed in Tables 15 and 16 after it was heated in a box oven (1300° F. oven temperature setpoint) for approximately 3 minutes, then removed from the oven and allowed to cool to room temperature in ambient air:

TABLE 15

| Sample ID | Transmitted Color Data | | | Coated Surface Reflected Color Data | | | Glass Surface Reflected Color Data | | | Solar Performance Data | | | Emissivity | $R_{sheet}$ (ohms/sq) |
|---|---|---|---|---|---|---|---|---|---|---|---|---|---|---|
| | $L^*$ | $a^*$ | $b^*$ | $L^*$ | $a^*$ | $b^*$ | $L^*$ | $a^*$ | $b^*$ | TSET (%) | TSER1 (%) | TSER2 (%) | | |
| 7 (after heating) | 90.13 | −3.32 | 2.78 | 26.33 | 6.46 | 0.39 | 28.22 | 4.00 | −1.85 | 32.59 | 53.28 | 40.66 | 0.027 | 1.13 |

TABLE 16

IG Unit Performance Calculated from Spectral Properties of Example 7 after heating

| Sample ID | IG unit configuration | coated surface | Luminous Transmittance (%) | $a^*T$ | $b^*T$ | Luminous Exterior Reflectance (%) | $a^*$Rext | $b^*$Rext | shading coefficient, SC (unitless) | solar heat gain coefficient, SHGC (unitless) | LSG |
|---|---|---|---|---|---|---|---|---|---|---|---|
| 7 (after heating) | outer light = 6 mm SOLEXIA ®, inner light = 2.3 mm CLEAR | #3 | 59.2 | −9.60 | 3.66 | 10.5 | −1.80 | −0.10 | 0.38 | 0.33 | 1.79 |

Example 8

Sample 8 Included

A first separation layer 22 having a first dielectric film of an oxide of an alloy of 54% zinc:46% tin (by weight) deposited on a glass substrate having a thickness of about 6 millimeters; the dielectric film had physical thickness estimated to be about 257 Å (25.7 nanometers, nm), a second dielectric film of an oxide of an alloy of 90% zinc:10% tin (by weight) deposited on the first dielectric layer; the second dielectric film had physical thickness estimated to be about 64 Å (6.4 nanometers, nm) providing dielectric films having a combined physical estimated thickness of 321 Å (32.1 nm);

A first infrared-reflective layer 16 having a metallic silver (Ag) having a physical thickness of the silver layer estimated to be about 119 Å (11.9 nm) deposited on the first separation layer was;

A second separation layer 24 having a primer film of metallic titanium (Ti) having a physical thickness estimated to be about 20 Å (2.0 nm) deposited on the silver film of the first infrared-reflective layer 16 and a first dielectric film of an oxide of an alloy of 90% zinc:10% tin (by weight) deposited on the primer film of the second separation layer; the first dielectric film had physical thickness estimated to be about 92 Å (9.2 nanometers, nm), a second dielectric film of an oxide of an alloy of 54% zinc:46% tin (by weight) deposited on the first dielectric film; the second dielectric film had physical thickness estimated to be about 632 Å (63.2 nanometers, nm), a third dielectric film of an oxide of an alloy of 90% zinc:10% tin (by weight) deposited on the second dielectric layer; the third dielectric film had physical thickness estimated to be about 108 Å (10.8 nanometers, nm) providing three dielectric films having a combined physical thickness estimated to be about 832 Å (83.2 nm);

A second infrared-reflective layer 18 having a metallic silver (Ag) film having a thickness estimated to be about 176 Å (17.6 nm) deposited on the third dielectric film of the second separation layer;

An outermost separation layer 28 having a primer film of metallic titanium (Ti) having a physical thickness of about 20 Å (2.0 nm) deposited on the second infrared-reflecting layer, a first dielectric film of an oxide of an alloy of 90% zinc:10% tin (by weight) deposited on the primer film of the outermost separation layer; the first dielectric film had physical thickness estimated to be about 72 Å (7.2 nanometers, nm), a second dielectric film of an oxide of an alloy of 54% zinc:46% tin (by weight) deposited on the first dielectric film; the second dielectric film had physical thickness estimated to be about 134 Å (13.4 nanometers, nm), the first and second dielectric films having a combined physical thickness estimated to be about 206 Å (20.6 nm), and a protective overcoat film of an oxide of titanium (Ti) having a physical thickness of estimated to be about 44 Å (4.4 nm) deposited on the dielectric film.

Sample 8 had the properties in Tables 17 and 18.

on a glass substrate having a thickness of about 6 millimeters; the dielectric film had physical thickness estimated to be about 286 Å (28.6 nanometers, nm), a second dielectric film of an oxide of an alloy of 90% zinc:10% tin (by weight) deposited on the first dielectric layer; the second dielectric film had physical thickness estimated to be about 67 Å (6.7 nanometers, nm) providing dielectric films having a combined physical estimated thickness of 353 Å (35.3 nm);

A first infrared-reflective layer 16 having a metallic silver (Ag) having a physical thickness of the silver layer estimated to be about 109 Å (10.9 nm) deposited on the first separation layer;

A second separation layer 24 having a primer film of metallic titanium (Ti) having a physical thickness estimated to be about 20 Å (2.0 nm) deposited on the silver film of the first infrared-reflective layer 16 and a first dielectric film of an oxide of an alloy of 90% zinc:10% tin (by weight) deposited on the primer film of the second separation layer; the first dielectric film had physical thickness estimated to be about 94 Å (9.4 nanometers, nm), a second dielectric film of an oxide of an alloy of 54% zinc:46% tin (by weight) deposited on the first dielectric film; the second dielectric film had physical thickness estimated to be about 648 Å (64.8 nanometers, nm), a third dielectric film of an oxide of an alloy of 90% zinc:10% tin (by weight) deposited on the second dielectric layer; the third dielectric film had physical thickness estimated to be about 111 Å (1.11 nanometers, nm) providing three dielectric films having a combined physical thickness estimated to be about 852 Å (85.2 nm);

A second infrared-reflective layer 18 having metallic silver (Ag) having a thickness estimated to be about 182 Å (18.2 nm) deposited on the third dielectric film of the second separation layer;

An outermost separation layer 28 included a primer film of metallic titanium (Ti) having a physical thickness of about 20 Å (2.0 nm) deposited on the second infrared-reflecting layer,

TABLE 17

| Sample ID | Transmitted Color Data | | | Coated Surface Reflected Color Data | | | Glass Surface Reflecteded Color Data | | | Solar Performance Data | | | Emissivity | $R_{sheet}$ (ohms/sq) |
|---|---|---|---|---|---|---|---|---|---|---|---|---|---|---|
| | L* | a* | b* | L* | a* | b* | L* | a* | b* | TSET (%) | TSER1 (%) | TSER2 (%) | | |
| 8 | 87.50 | −2.94 | 4.68 | 41.67 | −9.28 | −2.29 | 41.34 | −10.49 | −13.35 | 29.62 | 56.70 | 33.78 | 0.031 | 1.55 |

TABLE 18

IG Unit Performance Calculated from Spectral Properties of Sample 8

| SampleID | IG unit configuration | coated surface | Luminous Transmittance (%) | a*T | b*T | Luminous Exterior Reflectance (%) | a*Rext | b*Rext | shading coefficient, SC (unitless) | solar heat gain coefficient, SHGC (unitless) | LSG |
|---|---|---|---|---|---|---|---|---|---|---|---|
| 8 | outer light = 6 mm SOLEXIA ®, inner light = 6 mm CLEAR | #3 | 55.3 | −9.20 | 5.25 | 14.9 | −11.00 | −0.70 | 0.36 | 0.31 | 1.78 |

Example 9

Sample 9 Included

A first separation layer 22 having a first dielectric film of an oxide of an alloy of 54% zinc:46% tin (by weight) deposited a first dielectric film of an oxide of an alloy of 90% zinc:10% tin (by weight) deposited on the primer film of the outermost separation layer; the first dielectric film had physical thickness estimated to be about 75 Å (7.5 nanometers, nm), a second dielectric film of an oxide of an alloy of 54% zinc:46% tin (by weight) deposited on the first dielectric film; the second dielectric film had physical thickness estimated to be about 139 Å (13.9 nanometers, nm), the first and second dielectric films having a combined physical thickness estimated to be about 214 Å (21.4 nm), and a protective overcoat film of an oxide of titanium (Ti) having a physical thickness of estimated to be about 44 Å (4.4 nm) deposited on the dielectric film.

Sample 9 had the properties detailed in Tables 19 and 20.

A second infrared-reflective layer 18 having a metallic silver (Ag) having a thickness estimated to be about 124 Å (12.4 nm) deposited on the third dielectric film of the second separation layer;

A third separation layer 24 having a primer film of metallic titanium (Ti) having a physical thickness estimated to be about 20 Å (2.0 nm) deposited on the silver film of the first infrared-reflective layer 18 and a first dielectric film of an

TABLE 19

| Sample ID | Transmitted Color Data | | | Coated Surface Reflected Color Data | | | Glass Surface Reflected Color Data | | | Solar Performance Data | | | Emissivity | $R_{sheet}$ (ohms/sq) |
|---|---|---|---|---|---|---|---|---|---|---|---|---|---|---|
| | L* | a* | b* | L* | a* | b* | L* | a* | b* | TSET (%) | TSER1 (%) | TSER2 (%) | | |
| 9 | 87.23 | −4.36 | 5.11 | 44.35 | −1.44 | −1.32 | 43.52 | −5.60 | −12.58 | 29.55 | 57.65 | 33.88 | 0.025 | 1.58 |

TABLE 20

| | IG Unit Performance Calculated from Spectral Properties of Sample 9 | | | | | | | | | |
|---|---|---|---|---|---|---|---|---|---|---|
| Sample ID | IG unit configuration | coated surface | Luminous Transmittance (%) | a*T | b*T | Luminous Exterior Reflectance (%) | a*Rext | b*Rext | shading coefficient, SC (unitless) | solar heat gain coefficient, SHGC (unitless) | LSG |
| 9 | outer light = 6 mm SOLEXIA ®, inner light = 6 mm CLEAR | #3 | 54.9 | −10.00 | 5.66 | 16.0 | −7.20 | −0.20 | 0.35 | 0.30 | 1.83 |

Example 10

Sample 10 Included

A first separation layer 22 having a first dielectric film of an oxide of an alloy of 54% zinc:46% tin (by weight) deposited on a glass substrate having a thickness of about 6 millimeters; the dielectric film had physical thickness estimated to be about 390 Å (39.0 nanometers, nm), a second dielectric film of an oxide of an alloy of 90% zinc:10% tin (by weight) deposited on the first dielectric layer; the second dielectric film had physical thickness estimated to be about 104 Å (10.4 nanometers, nm) providing dielectric films having a combined physical estimated thickness of 494 Å (49.4 nm);

A first infrared-reflective layer 16 having a metallic silver (Ag) having a physical thickness of the silver layer estimated to be about 106 Å (10.6 nm) deposited on the first separation layer;

A second separation layer 24 having a primer film of metallic titanium (Ti) having a physical thickness estimated to be about 20 Å (2.0 nm) deposited on the silver film of the first infrared-reflective layer 16 and a first dielectric film of an oxide of an alloy of 90% zinc:10% tin (by weight) deposited on the primer film of the second separation layer; the first dielectric film had physical thickness estimated to be about 97 Å (9.7 nanometers, nm), a second dielectric film of an oxide of an alloy of 54% zinc:46% tin (by weight) deposited on the first dielectric film; the second dielectric film had physical thickness estimated to be about 551 Å (55.1 nanometers, nm), a third dielectric film of an oxide of an alloy of 90% zinc:10% tin (by weight) deposited on the second dielectric layer; the third dielectric film had physical thickness estimated to be about 97 Å (9.7 nanometers, nm) providing three dielectric films having a combined physical thickness estimated to be about 744 Å (74.4 nm);

oxide of an alloy of 90% zinc:10% tin (by weight) deposited on the primer film of the second separation layer; the first dielectric film had physical thickness estimated to be about 99 Å (9.9 nanometers, nm), and a second dielectric film of an oxide of an alloy of 54% zinc:46% tin (by weight) deposited on the first dielectric film; the second dielectric film had physical thickness estimated to be about 565 Å (56.5 nanometers, nm) a third dielectric film of an oxide of an alloy of 90% zinc:10% tin (by weight) deposited on the second dielectric layer; the third dielectric film had physical thickness estimated to be about 99 Å (9.9 nanometers, nm) providing three dielectric films having a combined physical thickness estimated to be about 764 Å (76.4 nm);

A third infrared-reflective layer 20 was metallic silver (Ag) having a thickness estimated to be about 181 Å (18.1 nm) deposited on the third dielectric film of the third separation layer.

An outermost separation layer 28 included a primer film of metallic titanium (Ti) having a physical thickness of about 20 Å (2.0 nm) deposited on the second infrared-reflecting layer, a first dielectric film of an oxide of an alloy of 90% zinc:10% tin (by weight) deposited on the primer film of the outermost separation layer; the first dielectric film had physical thickness estimated to be about 93 Å (9.3 nanometers, nm), a second dielectric film of an oxide of an alloy of 54% zinc:46% tin (by weight) deposited on the first dielectric film; the second dielectric film had physical thickness estimated to be about 217 Å (21.7 nanometers, nm), the first and second dielectric films having a combined physical thickness estimated to be about 310 Å (31.0 nm), and a protective overcoat film of an oxide of titanium (Ti) having a physical thickness of estimated to be about 46 Å (4.6 nm) deposited on the dielectric film.

Sample 10 had the properties detailed in Tables 21 and 22.

TABLE 21

| Sample ID | Transmitted Color Data | | | Coated Surface Reflected Color Data | | | Glass Surface Reflected Color Data | | | Solar Performance Data | | | Emissivity | $R_{sheet}$ (ohms/sq) |
|---|---|---|---|---|---|---|---|---|---|---|---|---|---|---|
| | L* | a* | b* | L* | a* | b* | L* | a* | b* | TSET (%) | TSER1 (%) | TSER2 (%) | | |
| 10 | 85.57 | −4.44 | 1.94 | 34.05 | −1.93 | 0.47 | 37.35 | −6.00 | −1.96 | 25.17 | 57.82 | 33.05 | 0.026 | 1.06 |

TABLE 22

IG Unit Performance Calculated from Spectral Properties of Sample 10 on 6 mm Clear Glass Substrate

| SampleID | IG unit configuration | coated surface | Luminous Transmittance (%) | a*T | b*T | Luminous Exterior Reflectance (%) | a*Rext | b*Rext | shading coefficient, SC (unitless) | solar heat gain coefficient, SHGC (unitless) | LSG |
|---|---|---|---|---|---|---|---|---|---|---|---|
| 10 | outer light = SOLEXIA ®, inner light = CLEAR | #3 | 51.9 | −10.00 | 2.85 | 12.5 | −5.70 | 0.64 | 0.35 | 0.30 | 1.73 |

Example 11

Samples 11-13 had the layer structures shown in Table 23 and were deposited on a 6 mm clear glass sheet.

TABLE 23

| Sample # | $Zn_2SnO_4$ basecoat component (nm) | ZnO basecoat component (nm) | bottom Ag (nm) | bottom Ti primer (nm) | ZnO "bottom centercoat" component (nm) | $Zn_2SnO_4$ "bottom centercoat" component (nm) | ZnO "bottom centercoat" component (nm) | center Ag (nm) |
|---|---|---|---|---|---|---|---|---|
| 11 | 33.0 | 14.6 | 12.2 | 1.1 | 12.1 | 49.3 | 12.1 | 13.9 |
| 12 | 32.3 | 16.1 | 12.4 | 2.1 | 11.4 | 49.2 | 12.1 | 14.3 |
| 13 | 29.1 | 13.7 | 12.2 | 1.1 | 12.1 | 49.3 | 12.1 | 13.9 |

| Sample # | center Ti primer (nm) | ZnO "top centercoat" component (nm) | $Zn_2SnO_4$ "top centercoat" component (nm) | ZnO "top centercoat" component (nm) | top Ag (nm) | top Ti primer (nm) | ZnO Topcoat component (nm) | $Zn_2SnO_4$ Topcoat Component (nm) | $TiO_2$ Overcoat (nm) |
|---|---|---|---|---|---|---|---|---|---|
| 11 | 1.2 | 11.2 | 51.1 | 11.5 | 16.9 | 1.1 | 10.8 | 21.4 | 3.7 |
| 12 | 2.2 | 10.7 | 50.7 | 11.1 | 16.4 | 1.9 | 10.3 | 21.2 | 3.4 |
| 13 | 1.2 | 10.8 | 50.4 | 11.5 | 16.7 | 1.1 | 10.0 | 21.4 | 3.7 |

Samples 11-13 provided the spectral properties shown in Tables 24 for a coated sheet. The calculated reference IG unit performance for Samples 11-13 is shown in Table 25.

TABLE 24

| Sample # | Transmitted Color Data* | | | Coated Surface Reflected Color Data* | | | Glass Surface Reflected Color Data* | | |
|---|---|---|---|---|---|---|---|---|---|
| | L* T | a* T | b* T | L* T | a* R | b* R | L* R | a* R | b* R |
| 11 | 87.23 | −4.67 | 2.62 | 27.21 | −4.82 | −5.52 | 32.97 | −4.35 | −4.17 |
| 12 | 89.79 | −2.86 | 1.93 | 27.21 | −5.20 | −5.00 | 31.99 | −5.19 | −3.96 |
| 13 | 87.36 | −5.10 | 1.73 | 24.69 | −2.16 | −2.13 | 31.03 | −2.93 | −1.33 |

TABLE 24-continued

Solar Performance Data**

| Sample # | TSET, total solar energy transmittance (%) | TSER1, total solar reflectance from coated surface (%) | TSER2, total solar reflectance from uncoated glass surface (%) | Emissivity | Rsheet (ohms/square) |
|---|---|---|---|---|---|
| 11 | 26.66 | 55.69 | 35.34 | 0.030 | 1.18 |
| 12 | 29.37 | 56.88 | 35.29 | 0.012 | 0.85 |
| 13 | 26.69 | 55.58 | 35.18 | 0.031 | 1.19 |

TABLE 25

| Sample # | Tvis (%) | a*T | b*T | Rext_vis (%) | Rext_a* | Rext_b* | SC | SHGC | LSG Ratio |
|---|---|---|---|---|---|---|---|---|---|
| 11 | 54.4 | −11.00 | 3.45 | 10.6 | −6.10 | −2.00 | 0.36 | 0.31 | 1.74 |
| 12 | 58.7 | −9.20 | 2.90 | 10.6 | −6.40 | −2.00 | 0.36 | 0.31 | 1.88 |
| 13 | 54.6 | −11.00 | 2.71 | 10.1 | −4.90 | −1.00 | 0.37 | 0.32 | 1.73 |

As can be appreciated, other aesthetics and solar performance can be achieved using the aforementioned general coating stack design. For example IG units can be made using the coatings of the invention with varies types of glasses. For example, and not limiting to the invention having a glass that limits the transmission of ultraviolet energy similar to the type sold by PPG Industries, Inc. under the trademark Solargreen; a blue tint glass e.g. of the type sold by PPG Industries Inc. under the trademark Azurlite; a glass having low transmission e.g. of the type sold by PPG Industries inc. under the trademark Solarbronze; and of the type sold by Pilkington-LOF under the trademark BlueGreen.

As can be appreciated, the aforementioned discussion and Examples are only meant to illustrate embodiments of the invention, and that the invention is not limited thereto.

What is claimed is:

1. An insulating glass unit, comprising:
a first pane defining a #1 surface and a #2 surface;
at least one second pane comprising clear glass and defining a #3 surface and a #4 surface, with the #2 surface facing the #3 surface; and
a coating formed over at least a portion of the #3 surface; wherein the coating comprises
a first separation layer comprising a zinc oxide layer over a zinc stannate layer, wherein the zinc oxide layer has a thickness in the range of 75 Å to 150 Å;
a first infrared reflective layer deposited over the first separation layer;
a second separation layer comprising a first zinc oxide layer having a thickness in the range of 75 Å to 150 Å, a zinc stannate layer deposited over the first zinc oxide layer, and a second zinc oxide layer having a thickness in the range of 75 Å to 150 Å deposited over the zinc stannate layer;
a second infrared reflective layer deposited over the second separation layer;
a third separation layer comprising a first zinc oxide layer having a thickness in the range of 75 Å to 150 Å, a zinc stannate layer deposited over the first zinc oxide layer, and a second zinc oxide layer having a thickness in the range of 75 Å to 150 Å deposited over the zinc stannate layer; and
a third infrared reflective layer deposited over the third separation layer; and
wherein the coating provides the unit with a reference solar heat gain coefficient of less than or equal to 0.36.

2. The unit of claim 1, wherein the coating provides a reference heat gain coefficient of less than or equal to 0.32.

3. The unit of claim 1, having a reference visible light transmittance in the range of 50% to 60%.

4. The unit of claim 1, having a reference transmitted a* (a*T) in the range of −5 to −12.

5. The unit of claim 1, having a reference transmitted b* (b*T) in the range of 0 to 5.

6. The unit of claim 1, having a reference exterior visible light reflectance (Rext vis) in the range of 5% to 15%.

7. The IG unit of claim 1, having a reference reflected exterior a* (Rexta*) in the range of −2 to −10.

8. The IG unit of claim 1, having a reference reflected exterior b* (Rextb*) in the range of −0 to −5.

9. The IG unit of claim 1, having a reference shading coefficient of less than 0.41.

10. The unit of claim 1, wherein the first pane comprises tinted or colored glass.

11. The article of claim 1, wherein the infrared reflective layers include at least one metal selected from the group consisting of gold, copper, silver, or mixtures, alloys, or combinations thereof.

12. The article of claim 1, including a fourth separation layer comprising at least one dielectric layer deposited over the third infrared reflective layer.

13. The article of claim 12, wherein the fourth layer comprises a zinc stannate layer deposited over a zinc oxide layer.

14. An insulating glass unit, comprising:
a first pane defining a #1 surface and a #2 surface, the first pane comprising tinted or colored glass;
at least one second pane comprising clear glass and defining a #3 surface and a #4 surface, with the #2 surface facing the #3 surface; and
a coating formed over at least a portion of the #3 surface, wherein the coating comprises:
a first separation layer comprising a zinc oxide layer deposited over a zinc stannate layer, wherein the zinc oxide layer has a thickness in the range of 100 Å to 150 Å;
a first infrared reflective layer deposited over the first separation layer, wherein the first infrared reflective layer is silver;

a second separation layer comprising a first zinc oxide layer, a zinc stannate layer deposited over the first zinc oxide layer, and a second zinc oxide layer deposited over the zinc stannate layer, wherein the zinc oxide layers have thicknesses in the range of 100 Å to 120 Å;

a second infrared reflective layer deposited over the second separation layer, wherein the second infrared reflective layer is silver;

a third separation layer comprising a first zinc oxide layer, a zinc stannate layer deposited over the first zinc oxide layer, and a second zinc oxide layer deposited over the zinc stannate layer, wherein the zinc oxide layers have thicknesses in the range of 100 Å to 120 Å;

a third infrared reflective layer deposited over the third separation layer, wherein the third infrared reflective layer is silver; and a fourth separation layer comprising a zinc stannate layer deposited over a zinc oxide layer;

wherein the coating provides the unit with a reference solar heat gain coefficient of less than or equal to 0.36, a reference visible light transmittance in the range of 50% to 60%, a reference transmitted $a^*$ ($a^*T$) in the range of −5 to −12, a reference transmitted $b^*$ ($b^*T$) in the range of 0 to 5, a reference exterior visible light reflectance ($R_{ext}$ vis) in the range of 5% to 15%, a reference reflected exterior $a^*$ ($R_{ext}a^*$) in the range of −2 to −10, a reference reflected exterior $b^*$ ($R_{ext}b^*$) in the range of −0 to −5, and a reference shading coefficient of less than 0.41.

* * * * *